United States Patent [19]

Kikuchi et al.

[11] Patent Number: 4,514,597
[45] Date of Patent: Apr. 30, 1985

[54] CONTROL OF A KEY TELEPHONE SYSTEM USING A PULSE WIDTH MODULATED SIGNAL

[75] Inventors: Junzo Kikuchi, Kawasaki; Ryuzo Sugiura, Suginami; Mutsuhiro Yamamoto; Toshiro Yoshida, both of Yokohama, all of Japan

[73] Assignee: Tamura Electric Works, Ltd., Tokyo, Japan

[21] Appl. No.: 494,189

[22] Filed: May 13, 1983

[30] Foreign Application Priority Data

May 17, 1982 [JP] Japan .................. 57-82784

[51] Int. Cl.³ ............................................. H04M 1/72
[52] U.S. Cl. ............................. 179/99 M; 179/81 R
[58] Field of Search ............ 179/99 M, 18 AD, 81 R, 179/99 R, 99 A, 99 H, 99 LC, 99 P, 18 E; 320/8, 9

[56] References Cited

U.S. PATENT DOCUMENTS 4,234,765 11/1980 Sekiguchi ..................... 179/99 M

OTHER PUBLICATIONS

Australian Patent Publication No. AU-B-60038/80.

Primary Examiner—Stafford D. Schreyer
Attorney, Agent, or Firm—Charles E. Pfund

[57] ABSTRACT

In a signal transmission system of a key telephone system of the type comprising a main device connected to office lines and having an input/output port for transmitting and receiving signals, and a plurality of key telephone sets connected in parallel to the main device through a pair of signal lines for transmitting and receiving various control signals between the main device and the key telephone sets, wherein each of the control signals is constituted by a pulse width modulated time series signal of a predetermined number of bits, respective control signals are inputted and outputted in parallel to and from a bit input/output of the input/output port and wherein transmission and reception of the control signals between the main device and respective key telephone sets are simultaneously performed by parallel input/output operations of the calculating processing unit.

4 Claims, 9 Drawing Figures

CONTROL OF A KEY TELEPHONE SYSTEM USING A PULSE WIDTH MODULATED SIGNAL

BACKGROUND OF THE INVENTION

This invention relates to a signal transmission system of a key telephone system, and more particularly a signal transmission system for transmitting and receiving various control signals (i.e. control data) among a plurality of key telephone sets connected in parallel between a pair of signal lines.

A key telephone system generally comprises a plurality of key on telephone sets, and a control device which receives from the telephone sets such control signals as an office line selection signal, a local line selection signal, and a reservation signal for controlling interconnection between local key telephone sets as well as interconnection between the office lines and the key telephone sets and for controlling display of the state of the office lines on display devices provided for respective key telephone sets. The respective key telephone set and the control device are coupled through by a pair of talking lines and a pair of signal lines transmitting the control signals. The control signals are digitallized and transmitted between the control devices and the key telephone sets. One example of such control system is disclosed in Australian patent publication No. AU-B-60038/80, for example. In this system, the operating power is supplied to respective key telephone sets from the control device through exclusive power supply lines or the signal lines. Each control device comprises an arithmetic operation unit having a plurality of input-/output ports and performs various controls described above.

In the key telephone system, the transmission and reception of the control signals have been made in a time division mode in which the control signals are transmitted or received in time slots assigned to respective key telephone sets or through an exclusive temporary memory circuit connected between the control devices and the key telephone sets.

According to the latter method, however, the time necessary for transmitting and receiving the control signals increases in proportion to the number of the key telephone sets, thus shortening the processing time for executing various control operations in the control device at each predetermined period. Moreover, as the number of the exclusive temporary memory circuits for transmitted and received signals increases in proportion to the number of the telephone sets the construction of the control device becomes complicated.

Furthermore, in the prior art arithmetic operation unit, the number of the input/output units was limited to 4 through 8 so that it has been desired to transmit and receive signals among as many possible number of the key telephone sets with a limited number of inlet/output ports.

In a certain case, the control signals are transmitted through a transformer, but where the control signals are pulse width modulated, surge voltages are formed at the building up and building down portions of the pulse width modulated control signals. Consequently, when the waveforms of the received pulse width modulated signals are shaped by comparing them with a DC reference level, pulse width modulated signals different from the original pulse width modulated signals would result, thus failing accurate demodulation.

Although the pulse transformer may be constituted by a pulse transformer, such pulse transformer is more expensive than the ordinary transformer so that where a plurality of key telephone sets are widely distributed, the cost of installation increases.

In the key telephone system, speech signal lines and the control signal lines are generally installed closely adjacent, and since when digitalized control signals flow through the signal lines, pulse shaped noises would be induced in the speech signal lines. For this reason, in the prior art system, the signal lines were constituted by twisted paired lines for the purpose of eliminating the pulse shaped induced noises or to limit the amplitude of the control signal to a low level.

However, when the signal lines are constituted by twisted paired lines, the cost of installation increases. Further, when the amplitude of the control signal is limited to a low level, it becomes difficult to discriminate the levels at the receiving end, thus making to circuit design difficult.

SUMMARY OF THE INVENTION

It is therefore an object of this invention to provide a signal transmission system of a key telephone system capable of rapidly transmitting and receiving a control signal between a key telephone set and a control device with a simple construction.

Another object of this invention is to provide an improved key telephone system wherein even when a pulse width modulated control signal is transmitted through an ordinary transformer, the control signal can be accurately demodulated.

Still another object of this invention is to provide a signal transmission system of a key telephone system capable of simplifying the design of a circuit for receiving a control signal at the transmitting and receiving stations and which can economically install signal lines.

A further object of this invention is to provide a signal transmission system of a key telephone system capable of minimizing adverse effect upon communication signals transmitted through transmission lines.

According to this invention, there is provided a signal transmission system of a key telephone system of the type comprising a main device connected to office lines which includes a calculating processing unit having an input/output port for transmitting and receiving signals, and a plurality of key telephone sets connected in parallel to the main device through a pair of signal lines for transmitting and receiving various control signals between the main device and the key telephone sets, wherein each of the control signals is constituted by a pulse width modulated time series signal of a predetermined number of bits, respective control signals are inputted and outputted in parallel to and from a bit input/output of the input/output port and wherein transmission and reception of the control signals between the main device and respective key telephone sets are simultaneously performed by parallel input/output operations of the calculating processing unit.

DESCRIPTION OF THE PREFERRED EMBODIMENT

Figure 1:
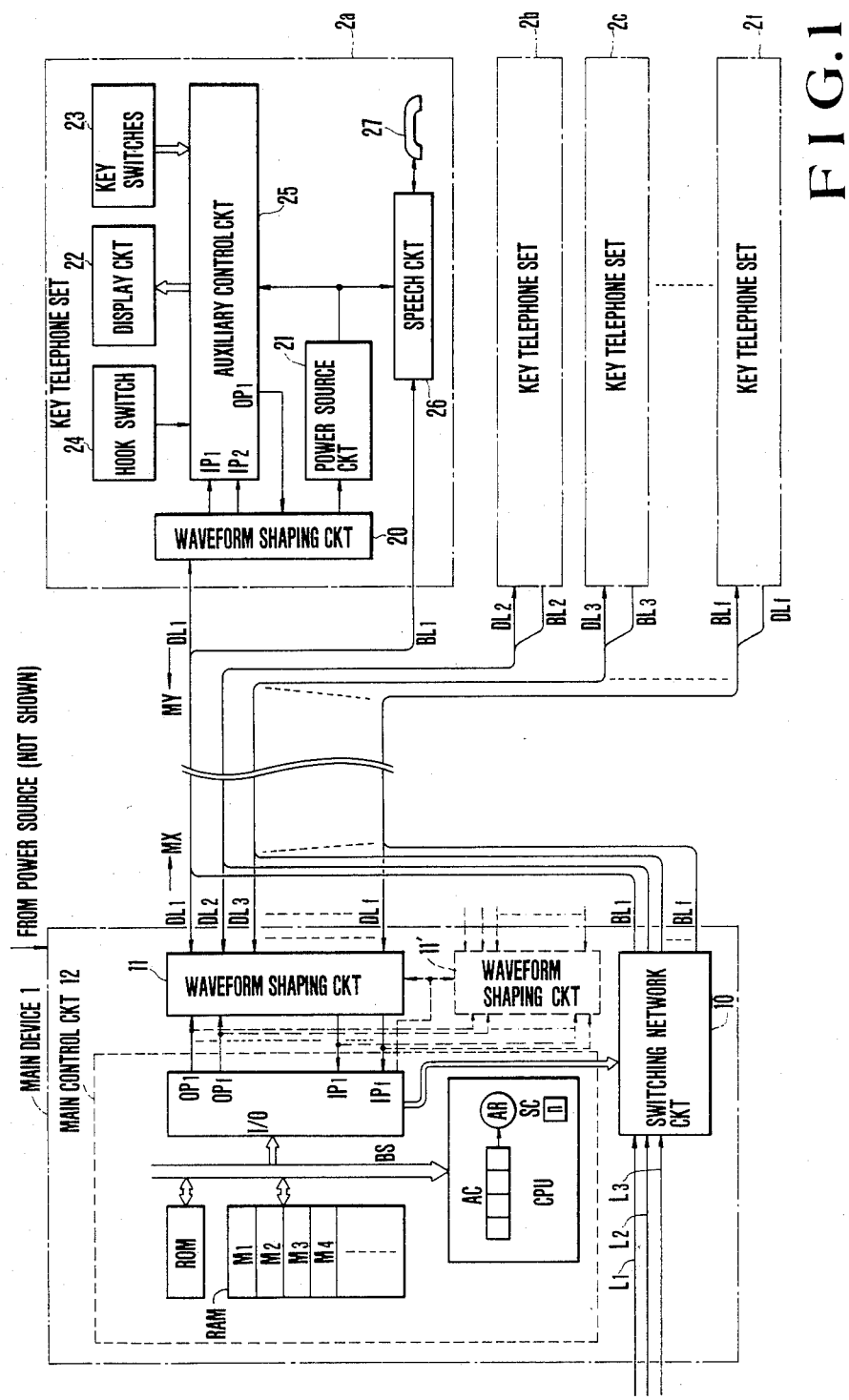
FIG. 1 is a block diagram showing one embodiment of a signal transmission system of a key telephone system according to this invention.

FIG. 1 shows one example of a key telephone system embodying the invention in which the invention is applied to a telephone system including 3 office lines and F local lines.

The key telephone system shown in FIG. 1 comprises a main device 1 connected to 3 office lines L1 through L3, and key telephone sets 2a through 2f connected in parallel to the main device 1 through paired data lines (control lines) DL1 through DL6 and speech lines 2a through 2f.

The main device 1 is constituted by a switching network circuit 10 for selectively connecting speech lines BL1 to BLF to office lines L1 to L3 or to other speech lines BL1 to BLF, a waveform shaping circuit 11 for shaping the waveform of a time series signal acting as control data sent in parallel from respective key telephone sets 2a to 2f over data lines DL1 to DLF, and a main control circuit 12 which decodes the control data MY sent from respective key telephone sets 2a to 2f for supplying necessary control signals to the switching network circuit 10 and for sending necessary control data MX to respective key telephone sets 2a to 2f via the waveform shaping circuit 11. The main device 1 is also connected to a power source device not shown for energizing the above components.

The main control circuit 12 comprises a well known microcomputer, i.e., an arithmetic processing unit (CPU) including an accumulator AC, a shift register AR, and a step counter SC etc., a fixed memory device (ROM) for storing a program, a temporary memory device (RAM) for temporarily storing informations and an input/output port I/O. These component elements are interconnected by bus lines BS. A microcomputer suitable for use in this invention is a 4 bit one-chip microcomputer MB 98801 or the like sold by Fujitsu Ltd in Japan.

Transmission and reception of the control data are made in parallel by respective bit inputs IP1 to IPF of the input port I/O and respective bit outputs OP1 to OPF of the output port respectively assigned to the key telephone sets 2a to 2f. The operating power is supplied to respective key telephone sets 2a to 2f through data lines DL1 to DLF.

As typically shown by telephone set 2a, each of the key telephone sets 2a to 2f is constituted by a waveform shaping circuit 20 which shapes the waveform of the time series signal acting as the control data exchanged between the telephone set 2a and the main device 1 over data line DL1, a power source circuit 21 for stabilizing the power supplied from the main device 1 through the waveform shaping circuit 20 and then supplying the stabilized power to various elements, and an auxiliary control circuit 25 which decodes the control data supplied from the main device 1 through the waveform shaping circuit 20 to supply the decoded control data to a display circuit 22 and for transferring the output signals from a key switched circuit 23 including a plurality of key switches in relation with R plurality of keys, and a hook switch 24 to the main device 1 to act as the control data MY. The telephone set 2a further comprises a speech circuit 26 connected to the switching network circuit 10 of the main device 1 over a speech line BL1, the speech circuit 26 supplying the voice signal supplied from office lines L1 to L3 or other key telephone sets 2a to 2f to the receiver of a handset 27. The speech circuit 26 also amplifies the voice signal from the transmitter and sends out the amplified voice signal on the speech line BL1.

The auxiliary control circuit 25 is constituted by a stored program type arithmetic processing unit (CPU). For example, like the main control circuit 12 it may be constituted by one of the series MB 88401 sold by Fujitsu Ltd. The control data for the main device 1 is sent out from the auxiliary control circuit 25 through output port OP1 (one bit output), while the control data from the main device 1 is taken into the auxiliary control circuit 25 through respective bit inputs IP1 and IP2 of the input port.

Figure 2:
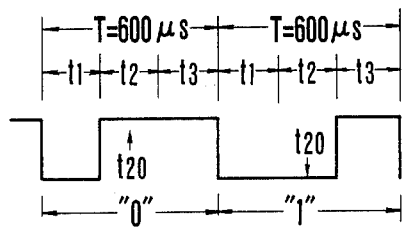
FIG. 2 shows the transmitted signal waveform of a control data.

The control data MX and MY exchanged between the main device 1 and respective key telephone sets 2a to 2f are respectively constituted by time series signals each made up of logics "0" and "1" subjected to pulse width modulation, as shown in FIG. 2. In this case, the logic "0" is represented by a signal in which only one interval t1 of intervals t1 to t3 each having 200 microseconds and obtained by dividing one bit time of 600 micro-seconds, for example with 3 is made to have an L level, while logic "1" is expressed by a signal in which both intervals t1 and t2 are made to have an L level. Where such time series signal is used as a signal of logic "0" or "1", the signal level at an intermediate timing t20 of the interval t2 can be used.

Figure 3:
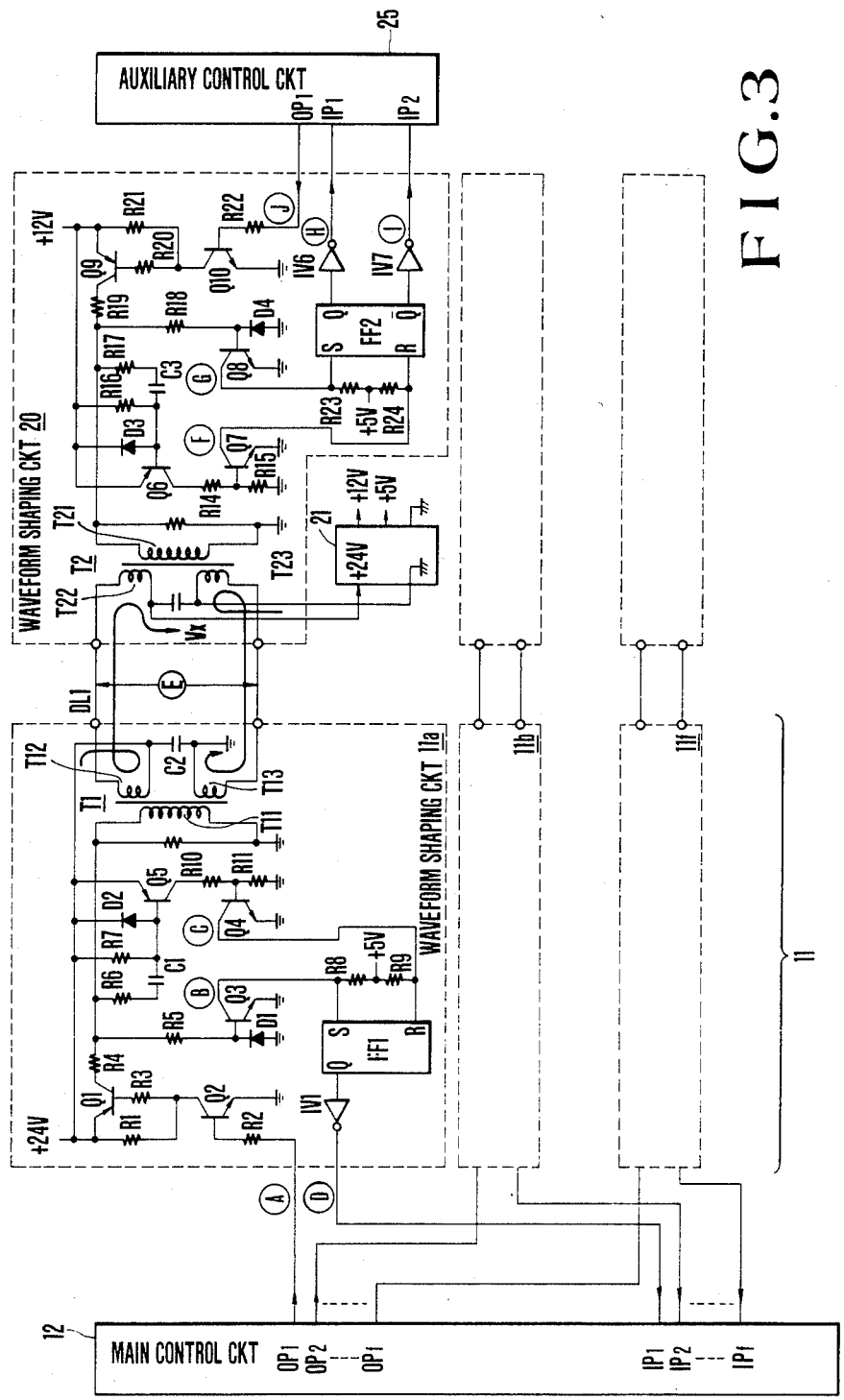
FIG. 3 is a detailed connection diagram showing the waveform shaping circuit shown in FIG. 1.

FIG. 3 shows the detail of the waveform shaping circuit 11 of the main device 1 and the waveform shaping circuit 20 of the key telephone sets 2a to 2f, in which the signal transmitting and receiving system of the key telephone set 2a is shown as a representative.

In FIG. 3, the waveform shaping circuit of the main device 1 exchanging data with the key telephone set 2a is designated by 11a, while the waveform shaping circuit of the key telephone set 2a exchanging data with main device 1 is designated by 20.

When transmitting a time series signal acting as a control data from the main device 1 to the key telephone set 2a, a time series signal A as shown in FIG. 4b is applied to the base electrode of a transistor Q2 of the waveform shaping circuit 11a via resistor R2 and the bit output OP1 among respective bit outputs OP1 to OP6 of the output of the main control circuit 12. Then, when the time series signal A is at the H level, the transistor Q2 is turned ON, but when the signal AP at the low level, the transistor Q2 is turned OFF. The collector electrode of transistor Q2 is connected to a +24 V source through a collector resistor R1 and to the base electrode of transistor Q1 through a resistor R3. The +24 V source is connected to the power source device not shown, the emitter electrode of transistor Q1 is connected directly to the +24 V source, and its collector electrode is connected to the primary winding T11 of a transformer T1 via resistor R4.

Accordingly, as the transistor Q2 is turned ON and OFF in accordance with the level change of the time series signal A, the transistor Q1 applies the voltage of the +24 V source to the primary winding T11 of the transformer T1 by ON/OFF controlling the voltage. In this case the value of resistor R4 is selected such that the amplitude of the voltage impressed upon the winding T11 would be one half of the source voltage that is 12 V. Then, a time series signal whose level changes between +12 V and 0 V would be impressed across the winding T11. As a consequence, a time series signal E having a waveform as shown in FIG. 4a will be induced across secondary windings T12 and T13 of transformer T1. Secondary windings T12 and T13 are isolated by a capacitor C2 to prevent flow of direct current so as to apply an operating voltage +24 V from the main device 1 to the key telephone set 2a through a passage shown by a symbol VX.

The time series signal E outputted by the transformer T1 is applied across primary windings T22 and T23 of a transformer T2 of the waveform shaping circuit 20 of the key telephone set 2a via a data line DL1. Then, a time series signal having a waveform similar to that of the time series signal E would be induced in the secondary winding of transformer T2.

In the same manner as in transformer T1 the turn ratio of the transformer T2 is selected to transform 12 V to about 2 V when transmitting the time series signal, whereas to transform about 2 V to about 12 V when receiving the time series signal which is supplied to succeeding stages.

Figure 5:
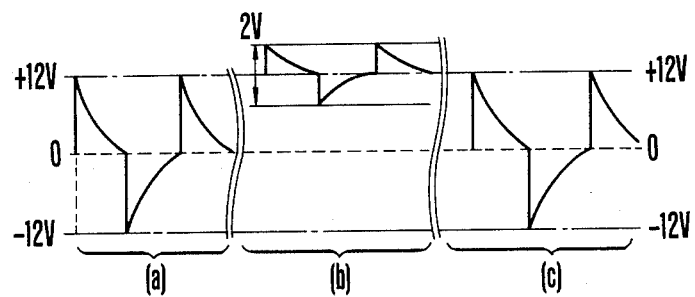
FIG. 5 is a timing chart useful to explain the operation of the main control circuit adapted to transmit the control data.

Consequently, when a time series signal is transmitted from the main device 1, signals having amplitudes shown by FIGS. 5a to 5c respectively appear across primary winding T11 of transformer T1, across signal line DL1, and across the secondary winding T21 of transformer T2.

One end of the secondary winding T21 of transformer T2 is grounded, and the other end is connected to serially connected resistor R18 and diode D4. When the potential of the junction between the resistor R18 and the cathode electrode of the diode D4 increases beyond a predetermined potential Vth1, transistor Q8 is turned ON. The other end of the secondary winding T21 is also connected to the base electrode of a transistor Q6 via a downward differentiating circuit including resistors R16, R17, a capacitor C3 and a diode D3 so that when the time series signal induced in the secondary winding T21 changes from positive to negative, a differentiated signal having a predetermined pulse width is obtained which is used to turn ON transistor Q6. The emitter electrode of this transistor Q6 is connected to a source of +12 V, while the collector electrode is connected to the base electrode of transistor Q7 via a resistor R14. Consequently, transistors Q6 and Q7 are simultaneously ON/OFF controlled.

The collector electrode of transistor Q8 is connected to a source of +5 V through a collector resistor R23 and to the set input S of a flip-flop circuit FF2. The collector electrode of transistor Q7 is connected to a source of +5 V through a collector resistor R24 and to the reset input R of the flip-flop circuit FF2. The set output Q of the flip-flop circuit FF2 is applied to an inverter IV6 so as to invert the polarity. The output of the inverter IV6 is supplied to the bit input IP1 of the input port of the auxiliary control circuit 25, while the inverted set output Q of the flip-flop circuit FF2 is applied to the bit input IP2 of the auxiliary control circuit 25 via an inverter IV7.

Consequently, when an n bit time series signal as shown in FIG. 4a is sent from the main device 1 a signal G which is maintained at the level L while the level of the time series signal E exceeds a predetermined level Vth0 (corresponding to the potential Vth1 described above) as shown in FIG. 4c would appear at the collector electrode of transistor Q8. Further, a signal F of a predetermined pulse width and at a level L when the time series signal E decreases from H level to L level as shown in FIG. 4d, would appear at the collector electrode of transistor Q7. Then the flip-flop circuit FF2 is set by the signal G and reset by the signal F. Consequently, the inverter IV6 produces a pulse signal H as shown in FIG. 4e, while the inverter IV7 produces a pulse signal I as shown in FIG. 4f.

More particularly, the inverter IV6 produces an inverted signal of the time series signal A sent from the main device 1 to act as the control data, whereas the inverter IV7 produces an output having the same waveform as the time series signal sent from the main device 1.

The time series signals H and I whose waveforms have been shaped as above described are applied to the auxiliary control circuit 25 to judge whether respective bit signals correspond to logic "0" data or logic "1" data. Then, by decoding the control data represented by an n bit signal, the control data can be used to control a display circuit or the like connected to the auxiliary control circuit 25.

The operating voltage of +24 V sent from the main device 1 through the data line is supplied to the power-source circuit 21 for converting the operating voltage of +24 V into the stabilized voltages of +12 V and +5 V which are supplied to the waveform shaping circuit 20, etc.

The time series data acting as the control data can be similarly transmitted from the key telephone set 2a to the main device 1. More particularly, the time series signal J sent out from the output port OP1 of the auxiliary control circuit 25 is applied to the base electrode of transistor Q10 via resistor R22 to be connected into a signal varying between +12 V and 0 V, and applied to the base electrode of transistor Q9 via a resistor R20. This signal is then applied to the secondary winding T21 of transformer T2 by the ON/OFF operations of transistor Q9 and then sent to the secondary winding T13 of transformer T1 of the main device 1. Then in the waveform shaping circuit 11a of the main device 1, the time series signal induced in the primary winding T11 of the transformer T1 is impressed upon serially connected resistor R5 and diode D1. While the potential at the junction between resistor R5 and diode D1 exceeds a predetermined potential, transistor Q3 is turned ON to produce a signal B similar to signal G outputted by the collector electrode of transistor Q8. The time series signal sent out from the primary winding T11 is also applied to a downward or building down differentiating circuit made up of resistors R6, R7, capacitor C1 and diode D2 to produce a differentiated signal in synchronism with the building down of the time series signal g. This differentiated signal is applied to the base electrode of transistor Q4 via transistor Q5 and resistor R10 to produce from the collector electrode of transistor a signal C similar to the collector output signal F of transistor Q7.

The signal B is applied to the set input S of the flip-flop circuit FF1, while signal C is applied to the reset input R.

In the same manner as the flip-flop circuit FF2 of the key telephone set, the flip-flop circuit FF1 is set at the time of building up of the time series signal of each bit, and the set output Q of the flip-flop circuit FF1 is inverted by an inverter IV1 to obtain an output signal D similar to the signal H.

The n bit time series signal D acting as the control data and shaped its waveform in a manner as above described is inputted to a bit input IP1 corresponding to the key telephone set 2a among the bit inputs IP1 to IP6 of the input port of the main control circuit 12.

Figure 4:
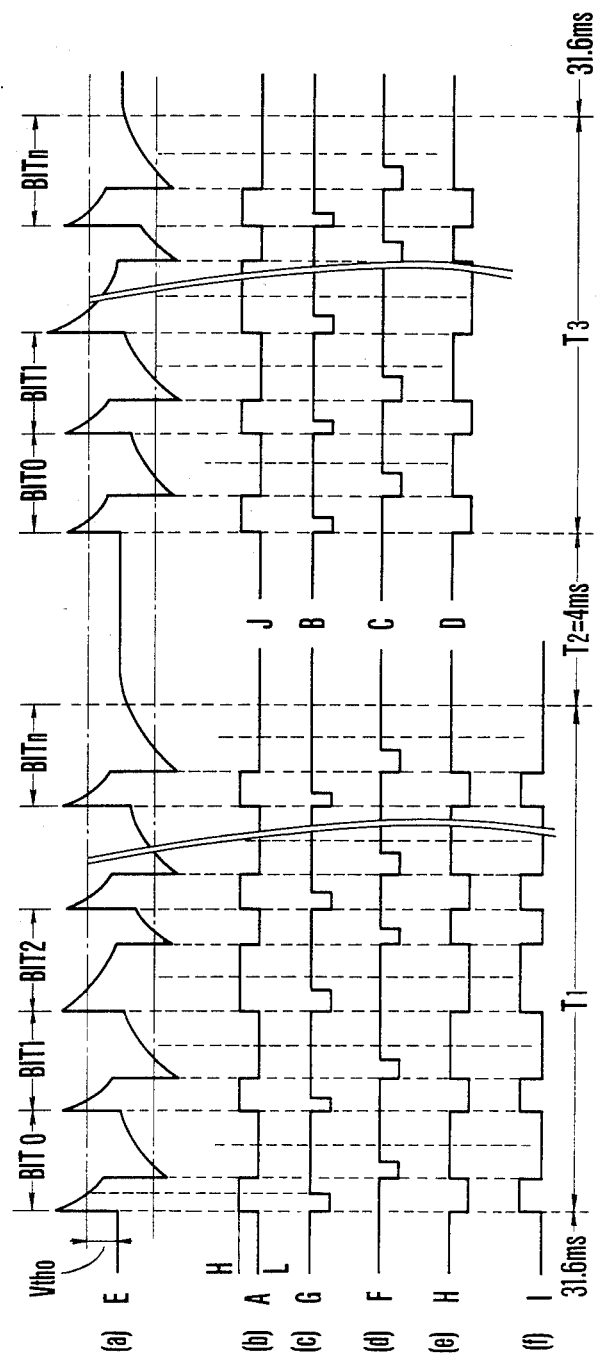
FIGS. 4a through 4f show timing charts useful to explain the operation of the circuit shown in FIG. 3.

In the timing chart shown in FIG. 4, the left-half interval T1 shows the waveforms of respective signals where the control data are sent from the main device 1 to the key telephone set, while the right-half portion spaced from the left half portion by a quiescent interval T2 shows the waveforms of respective signals where the control data are sent from the key telephone set to the main device 1.

The transmissions and receptions of the control data are effected simultaneously and in parallel among respective key telephone sets. In this case the transmissions of control data from respective key telephone sets to the main device 1 are commenced simultaneously after elasping a predetermined quiescent interval following the reception of the last bit of the control data sent from the main device.

Figure 6:
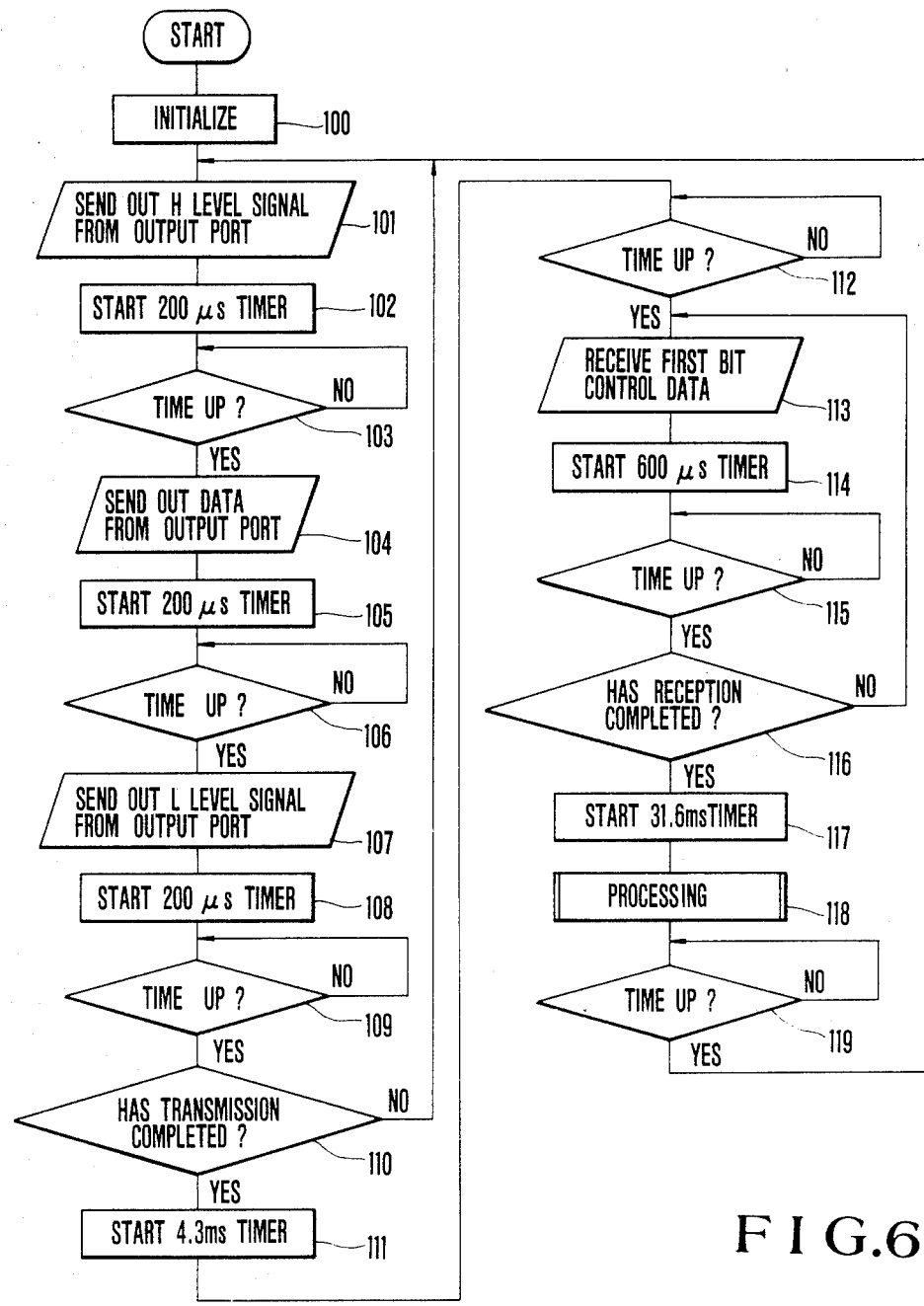
FIG. 6 is a flow chart useful to explain the data receiving operation of the main control circuit.

FIG. 6 is a flow chart showing the processings for transmitting and receiving the data at the main device 1. At step 100 the system is initialized and then at step 101, signals at H level are sent out from respective bit outputs OP1 to OP6 of the output bit for sending the control data to respective key telephone sets 2a to 2f. After that, at step 102, a timer having an operating time of 200 micro-seconds corresponding to interval t1 (see FIG. 2) of one bit is started. Then at step 103 a judgement is made as to whether the timer time 200 micro-seconds has elapsed or not, and if the result is not, advance of the program is stopped at this step. On the other hand, when the result is YES, at step 104, the control data of given bit times are sent out from the bit outputs OP1 to OP6 of the output port. More particularly, after the intervals t1 for respective bit times have elapsed, the control data of corresponding bit times are sent out during the interval t2. Then at step 105, a timer having an operating time of 200 micro-seconds that determines the sending out intervals t2 of the control data at respective bit times is started. At step 106 a judgement is made as to whether the timer time has elapsed or not. When the result of this judgement is YES, at step 107, L level signals are sent out from respective bit outputs OP1 to OP6 of the output port. Then at step 108, a timer having an operating time of 200 micro-seconds that determines the interval t3 in one bit time is started. At start 109 a judgement is made as to whether the timer time 200 micro-seconds has elapsed or not. In other words, when the L level signals have been sent out during 200 micro-seconds interval t3, at step 110 a judgement is made as to whether the transmission has been completed or not. In this manner, the transmission of the control data in a given bit time is completed.

In other words, at step 110, a judgement is made as to whether the transmission of n bit data has completed or not by checking whether the number of bits of the control data transmitted up to this time has reached a predetermined number n or not.

When the number of bits does not yet reach the predetermined number n the program is returned to step 101 to execute similar procedures. On the other hand, when the number of the transmitted bits has reached n, at step 111, a 4.3 ms timer is started for preparing to receive control data sent from respective key telephone sets 2a to 2f. The 4.3 ms timer is used for determining the timing (t20 shown in FIG. 2) for receiving the control data of the first bit sent from respective key telephone set after a quiescent interval T2.

After 4.3 ms has elapsed after the main device 1 is rendered to receive the control data, at step 112, a judgement is made whether 4.3 ms has elapsed or not. Then at step 113, the control data of the first bit is received. At step 114 a 600 micro-seconds timer is started which determines the timing for receiving the control data of the next bit. At step 115, a judgement is made as to whether 600 micro-seconds has elapsed or not. When the result of this judgement is YES, at step 116 a judgement is made as to whether the number of the received bits from respective key telephone sets 2a to 2f has reached the predetermined number or not, that is whether the reception has completed or not. When the result of this judgement is NO, the program is returned to stop 113 for receiving the control data of the remaining bits.

When the result of judgement at step 116 is YES, at step 117 a 31.6 ms timer is started which determines an interval before commencement of the next sending and reception when the control data is exchanged between the main device 1 and respective key telephone sets 2a to 2f.

During the interval of 31.6 ms, the main device 1 executes at step 118 processings based on the control data received from the respective key telephone sets. Upon completion of these processings, at step 119 a judgement is made as to whether the timer time 31.6 ms has elapsed or not according to the content of the 31.6 ms timer. When the result of judgement is NO, the program is returned to step 101 to repeat again the above described procedures until the control data comprising the next n bits is received.

Figure 9:
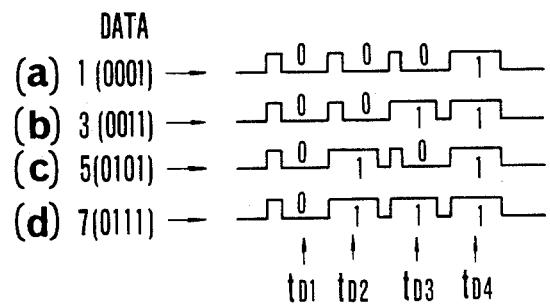
FIGS. 9a through 9d are waveforms showing one example of the control data sent out from the side of a telephone set.
Figure 8:
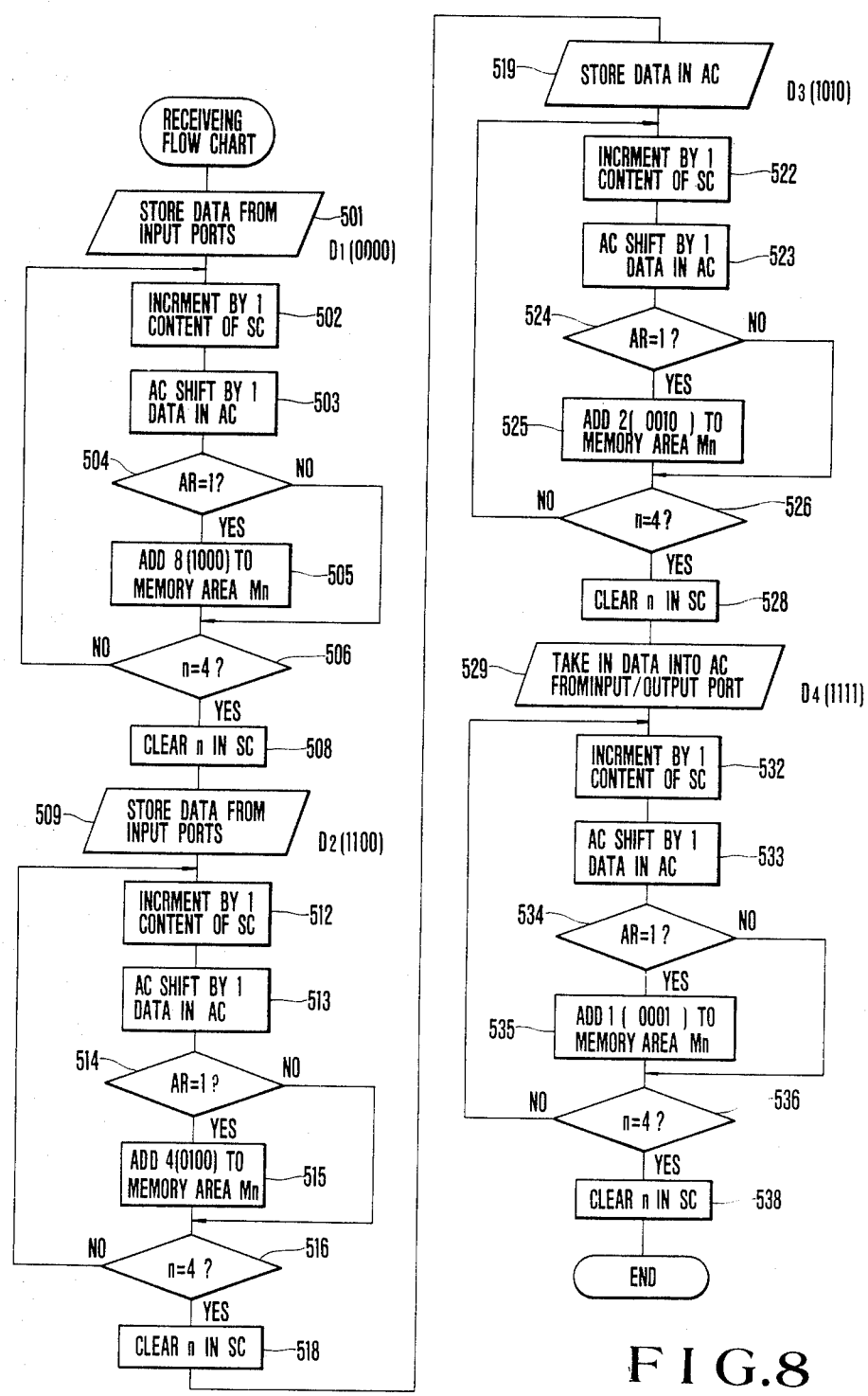
FIG. 8 is a flow chart adapted to explain the operation of the control circuit for transmitting the data.

Based on the data input operations into the main device 1 between steps 113 and 116, the main control circuit 12 executes the processings shown in FIGS. 8 and 9. In the following description, please note that the contents of the memory areas M1 to M4 of the RAM, of the accumulator of the CPU, of the register AR and of the step counter SC are cleared by the initialization operation executed at step 100. In the following description, it is assumed that the data used in four key telephone sets 2a, 2b, 2c and 2d are "1", "3", "5" and "7". These data are shown in FIGS. 8a to 8d as pulse width modulated binary data. In FIG. 8, tD1 to tD4 show timings at which the data are stored in the RAM of the main control circuit 12.

The waveforms shown in FIGS. 9a to 9d are inputted to the input ports IP1 to IP4 of the main control circuit 12 via the waveform shaping circuit 11. At this time, the main control circuit 12 executes the processings shown in FIG. 8 according to a program stored in its ROM.

When the main control circuit 12 is brought to a receiving state, at step 501 shown in FIG. 8, the data from the input ports IP1 to IP4 are received at the timing tD1 and applied in parallel to the accumulator AC of the CPU. The data D1 stored in the accumulator AC at this time is "0000". Then the CPU executes step 502 according to the program stored in the ROM so as to increment by +1 the content of the step counter SC of CPU, thus making n=1. Then at step 503 the data stored in the accumulator AC are shifted by one to the right for transferring the righthand end bit "0" to the register AR. Then at step 504, a judgement is made as to whether the content of the register AR is "1" or not. However, at this time, since the content is "0", the program is advanced to step 506 at which a check is made as to whether the content of the step counter SC is "4" or not. Since at this stage n=1, the program is returned to step 502 for sequentially shifting the content of the accumulator AC while incrementing the content of the step counter SC just in the same manner as above described and a check is made whether the content of the accumulator is "1" or not. When it becomes n=4, the program is advanced to the next step 508. In this example, since the data D1 received at the time tD1 is "0000", the program is not advanced from step 504 to step 505. However, if "1" were contained in the data D1, the program is transferred from step 504 to step 505 to add "8" that is a binary code "1000" to one of the corresponding memory areas M4 to M1 of the RAM. Then, at step 506 a judgement is made as to whether n=4 or not. By the processings described above, all memory regions M1 to M4 of the RAM become "0000".

Then at step 508 the contents n of the step counter SC of the CPU are cleared to prepare for the receival of the next data. At step 509, data are taken in at the timing tD2 through the input port IP1 to IP4 and inputted in parallel to the accumulator AC of the CPU. The data D1 stored in the accumulator AC at this time are "1100". Then at step 512 the count of the step counter SC of the CPU is incremented by "1". The operations of steps 512 to 516, except step 515, are the same as those of the steps 502, 503, 504 and 506 described above.

When the result of judgement at step 514 shows that the content of the register AR is "1", the program is advanced to step 515. In this example, since the data D2 is "1100", the first and second bits correspond thereto. At step 515, and at the first bit timing, "4" that is a binary code "0100" is added to the content in the memory area M4, while at the second bit timing "0100" is added to the content in the memory area M3.

Since the contents of the third and fourth bits are zero no addition operation is performed. Accordingly, when data D2 is taken in at the timing tD2, the contents of the memory areas M4 to M1 of the RAM are "0100", "1100" "0000" and "0000" respectively.

Then at step 518, the content n of the step counter SC is cleared to become "0".

After that, at step 519, data D3 shown in FIG. 9 is stored in the accumulator of the CPU at a timing tD5. Thus, the data D2 accumulated in the accumulator AC of the CPU becomes "1010". Then at step 522, the content of the step counter SC of CPU is incremented by +1. The operations at steps 522 to 526, except step 525, are the same as those of steps 502, 503, 504 and 506. At step 523, the content of AC is shifted to the right.

Then at step 524 a judgement is made as to whether the content of the register AR is "1" or not.

In this example since the data D3 is "1010" the first and second bits correspond thereto. At step 525 and at the timing of the first bit, "2" that is a binary code "0010" is added to the content in the memory area M4, whereas at the third bit "1010" is added to the content of the memory area M2. Since the contents of the second and fourth bits are "0", no addition is performed.

Consequently, when data D3 is stored at the timing of tD3, the contents of the memory regions M4 to M1 of the RAM are "0110", "0100", "0010" and "0100" respectively.

Then, at step 528, the content n of the step counter SC is cleared to "0". At step 529, data D4 shown in FIG. 9 are stored in the accumulator AC of CPU at the timing tD4. Then at step 532 the content of the step counter SC of the CPU is incremented by +1. The operations of steps 532 to 536, except step 535, are the same as those of steps 502, 503, 504 and 506.

When the result of judgement made at step 534 shows that the content of the register AR is "1", the program is advanced to step 535. In this example, since data D4 is "1111" all of the first to fourth bits correspond thereto. At step 535, "1" that is a binary code "0001" is added to the content of the memory region M4 at the first bit timing. In the same manner "0001" is sequentially added to the contents of the memory areas M3, M2 and M1.

Consequently, at the time when the data are stored at the timing tD4, contents of respective memory areas M4 to M1 of the RAM are "0111", "0101", "0011" and "0001" respectively, which correspond to the data sent to the main device 1 from the key telephone sets 2d, 2c, 2b and 2a. The state of accumulation of data in the memory areas of the RAM are shown in the following Table.

TABLE

|  | data added to memory area M1 and accumulated data | data added to memory area M2 and accumulated data | data added to memory area M3 and accumulated data | data added to memory area M4 and accumulated data |
| --- | --- | --- | --- | --- |
| at the time of initialization timing | 0000 | 0000 | 0000 | 0000 |
| tD1 | — | — | — | — |
| tD2 | — | — | 0100 | 0100 |
| tD3 | — | 0010 | — | 0010 |
| tD4 | 0001 | 0001 | 0001 | 0001 |
| data finally stored in respective memory areas | 0001 | 0011 | 0101 | 0111 |

From the foregoing description, it can be noted that the data sent to the main device 1 from the key telephone sets are stored directly in the main control circuit 12 without passing through any buffer circuit used in the prior art.

Figure 7:
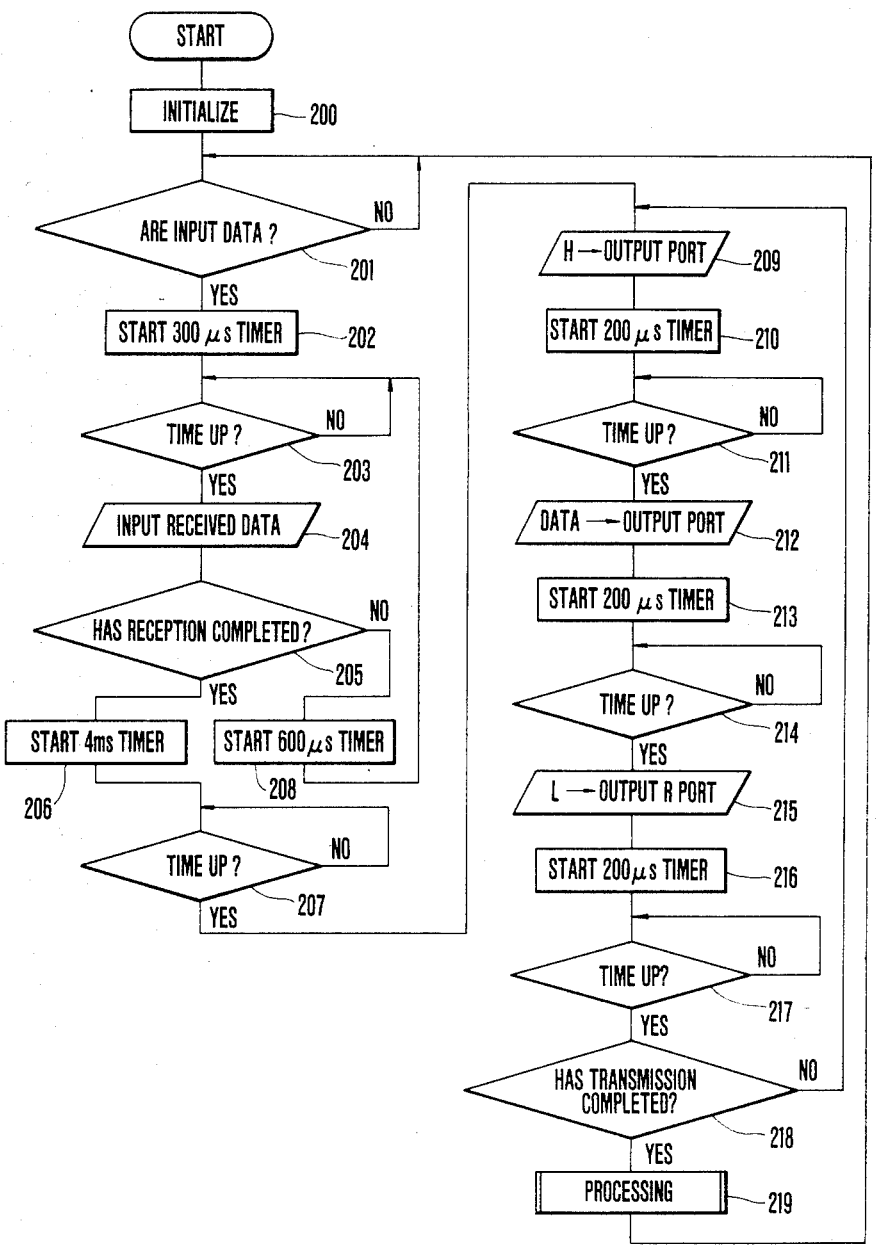
FIG. 7 is a flow chart showing processing for transmitting and receiving data to and from respective key telephone sets.

FIG. 7 is a flow chart showing the contents of processings for transmitting and receiving data among respective key telephone sets 2a through 2f. More particularly, the system is initialized at step 200, and then at step 201 a judgement is made as to whether control data was input or not. This judgement is done by checking whether the time series signal acting as the control data is at the H level or not. When the result of this judgement is YES, at the next step 202, a 300 micro-seconds timer is started. The operating time 300 micro-seconds of the timer corresponds to an interval between the building up time t2 of the H level signal during the interval of respective bit times, and the center timings t20 of the data portion during the interval t2. Accordingly, the control data of respective bits received from the main device is received by the auxiliary control circuit 25 at this timing t20.

Consequently, as the 300 micro-seconds timer is started at step 203, in the succeeding step 203, a judgement is made as to whether the time 300 micro-seconds has elapsed or not. If the result is YES, at the next step 204, the control data is taken in.

Upon completion of the reception of this control data of a bit, at the next step 205, a judgement is made as to whether the reception of the control data has been completed or not, that is the number of the control data already received has reached a predetermined n bits or not. When the number of the received data is less than n bits, the program is branched to step 208 for the purpose of receiving the control data of the remaining bits, and at step 208, a 600 micro-seconds timer is started and then the program is returned to step 203. The purpose of the 600 micro-seconds timer is to determine the timing during which the data of the next bit are taken.

When the reception of the control data consisting of n bits is completed, according to the judgement of step 205, the program is advanced to step 206 at which a 4 ms timer corresponding to the quiescent interval T2 is started to prepare for the transmission of the data to the main device.

The supply of data to the auxiliary control circuit 25 executed at steps 204 and 205 is identical to the operation of the main control circuit 12 which has already been described with reference to FIGS. 6 and 9.

At the end of the quiescent interval of 4 ms, at step 207 a judgement is made as to whether the quiescent time has elapsed or not. If the result of judgement is YES, at step 209 an H level signal is sent out from the output port OP1. Thereafter, at step 210, a 200 microseconds timer corresponding to the interval t1 of one bit time is started. At step 201 a judgement is made as to whether 200 micro-seconds has elapsed or not. When the result of judgement is YES, at step 212, the control data of the given bit is sent out. Then, at step 213 a 200 micro-seconds timer is started which determines the sending out times of the control data at respective bit times.

At step 214, a judgement is made as to whether 200 micro-seconds has elapsed or not. When the result of this judgement is YES, at step 215, an L level signal is sent out from the output port OP1. Since the sending out time of this L level signal is also set to 200 microseconds, at the next step 216 a 200 micro seconds timer is started. At step 217 a judgement is made as to whether the time 200 micro-seconds has elapsed or not. When the result of judgement is YES, at step 218 a judgement is made as to whether the number of bits transmitted to the main device 1 has reached the predetermined n bits or not, that is whether the transmission has completed or not. When the result of this judgement shows that the number of the transmitted bits is less than n, the program is returned to step 209 for sending out control data of the remaining bits by similar processings.

However, when the number of the transmitted bits has reached the predetermined number n, at the next step 219 a display control processing or the like is executed based on the control data received from the main device 1. When the processing at this step 219 completes, the program is returned to step 201 to wait for the reception of new control data. Such processings are simultaneously executed in parallel at respective key telephone sets starting from an instant at which the control data of the first bit is received from the main device.

For this reason, the main control circuit 12 of the main device 1 simultaneously receives in parallel each bit of the control data from the respective key telephone sets 2a to 2f. For this reason, the main control device 12 can simultaneously receive control data from all key telephone sets by repeating n times the reception of the control data which are inputted in parallel, with the result that increase in the number of key telephone sets installed does not increase the transmission time of the control data. Furthermore, since a predetermined control processing is executed after simultaneously receiving in parallel with a plurality of control data, it is not necessary to install a temporary memory circuit between the main control circuit 12 and respective key telephone sets 2a to 2f and it is only necessary to provide a waveform shaping circuit having characteristics commensurate with those of the transmission line, whereby the circuit construction can be simplified. In addition, since the control data are simultaneously inputted or outputted in accordance with respective bit inputs and outputs of the input and output port, any key telephone set is not required to exclusively use one input/output port, thus decreasing the number of input-/output ports necessary to transmit and receive signals.

Furthermore, in the main device since the transmission and reception of the control data are made simultaneously in parallel it is possible to synchronize the operations of respective key telephone sets by transmitting and receiving signals.

Although in the foregoing embodiment respective inputs/outputs of the input/output port correspond to respective key telephone sets, where the number of the bit inputs/outputs of one input/output port is less than the number of the key telephone sets, a second input-/output port is added so as to input or output in parallel the control data of only one bit which are exchanged among a predetermined number of key telephone sets by using the first input/output ports, and thereafter the second input/output port is selected for parallel input or output of the control data among remaining key telephone sets for only one bits. This operation is repeated a number of times corresponding to the number of bits constituting the control data. The example is shown in FIG. 1 by a dotted line. More particularly, the main device 1 is further provided with a waveform shaping circuit 11' in addition to the waveform shaping circuit 11, and the waveform shaping circuit 11' is connected to the ports OP1 to OPF and IP1 to IPF of the inputs/outputs of the input and output port I/O in paralleled with the waveform shaping circuit 11. Moreover, there are connected to the outputs of the waveform shaping circuit 11' telephone sets other than said sets 2a to 2f and the speech lines BL1 to BLf of the switching network circuit 10 are connected in parallel to those telephone sets as well. Which circuit, the waveform shaping circuit 11 or the waveform shaping circuit 11', is to be selected is controlled by a signal from a control port provided to the input and output port I/O.

As above described, according to this invention, the control data or signal transmitted between a main device and a plurality of key telephone sets is constituted by a pulse modulated time series signal of a predetermined number of bits and the control data are inputted and outputted in parallel into and out of respective bit inputs/outputs of the input/output port of an operational processing unit of the main device. Moreover the transmissions of the control data between respective key telephone sets and the main device are done by repeating parallel input/output operations of the time series signal.

For this reason, transmission of the control data among the main device and respective key telephone sets can be made rapidly with a simple construction and with a minimum number of the input/output ports. Moreover, as the transmission time of the control data is not influenced by the number of the key telephone sets installed, various control and processing times based on the transmitted control data can be made sufficiently long thereby facilitating the design.

What is claimed is;

1. In a signal transmission system of a key telephone system of the type comprising a main device connected to office lines which includes a calculating processing unit having an input/output port for transmitting and receiving signals, and a plurality of key telephone sets connected in parallel to said main device through a pair of signal lines for transmitting and receiving various control signals between said main device and said key telephone sets, the improvement wherein each of said control signals is constituted by a pulse width modulated time series signal of a predetermined number of bits, respective control signals are inputted and outputted in parallel to and from a bit input/output of said input/output port and wherein transmission and reception of said control signals between said main device and respective key telephone sets are simultaneously performed by parallel input/output operations of said calculating processing unit.

2. In a signal transmission system of a key telephone system of the type comprising a main device connected to office lines, and a key telephone system including a plurality of key telephone sets connected to said main device through a pair of signal lines for transmitting and receiving various control signals between said main device and said key telephone sets, the improvement which comprises:

a first waveform shaping circuit which includes a first transformer connected to the main device end of said signal lines;

a switching circuit for supplying a pulse width modulated control signal to said first transformer;

a second waveform shaping circuit which includes a second transformer connected to the key telephone set end of said signal lines so that said control signal is transmitted and received over a closed loop formed by said first and second transformers;

a detecting circuit associated with each of said transformers for detecting building up and building down of said pulse width modulated signal received through its respective transformer; and each waveform shaping circuit including a flip-flop circuit which inverts its operation states in response to output signals of its respective detecting circuit, thereby effecting waveform shaping of a received control signal.

3. The signal transmission system according to claim 2 wherein each of said detecting circuits comprises a differentiating circuit.

4. A signal transmission system of the type comprising a main device connected to office lines, and a key telephone system including a plurality of key telephone sets connected to said main device through a pair of signal lines for transmitting and receiving various control signals between said main device and said key telephone sets, the improvement which comprises transformers having a large turn ratio and connected between said signal lines and said main device and said key telephone sets respectively, whereby an amplitude of a transmitted control signal is limited by said transformer on the transmission side and an amplitude of a received control signal is increased by said transformer on the receiving side.

* * * * *

UNITED STATES PATENT AND TRADEMARK OFFICE
CERTIFICATE OF CORRECTION

PATENT NO. : 4,514,597
DATED : April 30, 1985
INVENTOR(S) : Junzo Kikuchi et al

It is certified that error appears in the above-identified patent and that said Letters Patent are hereby corrected as shown below:

Col. 2, lines 19,20: change "to circuit design" to

--the circuit design--

Col. 3, l. 29: change "DL6" to --DLf--

Signed and Sealed this

Seventeenth Day of June 1986

[SEAL]

Attest:

DONALD J. QUIGG

Attesting Officer

Commissioner of Patents and Trademarks